United States Patent [19]
Street

[11] Patent Number: 4,516,176
[45] Date of Patent: May 7, 1985

[54] MAGNETIC HEAD CLEANING DISKETTE

[75] Inventor: Jeffrey B. Street, Sunnyvale, Calif.

[73] Assignee: Verbatim Corporation, Sunnyvale, Calif.

[21] Appl. No.: 376,272

[22] Filed: May 10, 1982

[51] Int. Cl.³ .......................... G11B 5/012; G11B 5/41
[52] U.S. Cl. ...................................... 360/75; 360/128; 360/137
[58] Field of Search ............... 360/128, 133, 131, 135, 360/75, 137, 132, 134; 15/210 R, DIG. 12; 51/295, 309; 252/62.54, 62.56; 423/632

[56] References Cited

U.S. PATENT DOCUMENTS

| 3,978,520 | 8/1976 | Nowicki et al. | 360/128 |
| 3,996,095 | 12/1976 | Ahn et al. | 360/131 |
| 4,106,067 | 8/1978 | Masuyama et al. | 360/128 |
| 4,180,840 | 12/1979 | Allan | 360/128 |
| 4,384,311 | 5/1983 | McNeil | 360/128 |
| 4,415,939 | 11/1983 | Ballard | 360/75 |

Primary Examiner—Raymond F. Cardillo, Jr.
Attorney, Agent, or Firm—Thomas E. Schatzel

[57] ABSTRACT

A disk having a thin flexible platter with a mildly abrasive coating on at least one side thereof for contacting and cleaning a magnetic head. The coating includes magnetite ($Fe_3O_4$) having an internal crystalline form in the shape of octahedral crystals, conductive carbon black, a dispersing agent, a binder system, a cross-linker, and a lubricant. Since the magnetite is highly magnetic, data can be magnetically recorded on the coating for programming the magnetic head to be cycled across the coating to ensure a thorough cleaning of the head.

4 Claims, No Drawings

MAGNETIC HEAD CLEANING DISKETTE

BACKGROUND OF THE INVENTION

1. Field of the Invention

This invention relates generally to a magnetic head cleaning disk. More specifically, it concerns a thin flexible platter having a coating that is mildly abrasive for cleaning magnetic read/write heads in a disk system. The coating is highly magnetic for recording thereon, and a program can be written that instructs the disk system to cycle the heads across the coating surface for thorough cleaning.

2. Description of the Prior Art

In flexible disk systems, magnetic heads that contact the magnetic recording coating of diskettes tend to become covered with magnetic particles, binder and lubricant. Such deposits interfere with recording and playback operations, and must be periodically removed. Since the magnetic head is generally positioned within an interior portion of the disk system, it cannot be readily cleaned with a cloth soaked in a solvent, as in the case of open reel tape recorders and cassette recorders. One way to clean the magnetic heads is with a cleaning disk that is inserted into the disk system and rotated. Such disks have used a non-woven polyester fiber that smears oxide debris in the head area. Other disks have used an abrasive that tends to scratch and scrape the heads.

A head cleaning tape for video tape recorders is disclosed in U.S. Pat. No. 3,978,520 to Nowicki, et al. This tape has a coating including magnetic chromium dioxide that is highly abrasive. The coating is magnetically recorded upon to bear a video test pattern, and cleaning operation is stopped when the test pattern is clearly visible. This patent also mentions a Sony HC Tape that has a magnetic iron oxide coating.

U.S. Pat. No. 4,180,840 to Allen shows a cleaning disk with an abrasive surface on one side, positioned within a reversible container having special apertures which enable system software to determine the abrasive surface orientation. This assembly is used in a disk system having two transducer/pad pairs, oppositely-oriented so that both sides of the disk can be read. A system is disclosed for sweeping the transducers across the disk surface to equalize wear of the abrasive side.

A tape having an information bearing section and a cleaning section connected in series is disclosed in U.S. Pat. No. 3,069,815 to Valentine. The cleaning section has an absorbent cleaning material portion and an abrasive material portion. The abrasive material is ferric oxide ($Fe_2O_3$) in a binder described in U.S. Pat. No. 2,989,415 to Horton et al.

A floppy disk with a fibrous material layer for cleaning magnetic heads is disclosed in U.S. Pat. No. 4,065,798 to Sugisaki et al., and a similar disk is disclosed in U.S. Pat. No. 4,106,067 to Masuyama et al.. A floppy disk having a thin oxide coating for protecting and lubricating a recording disk is taught by U.S. Pat. No. 3,353,166 to Brock.

SUMMARY OF THE INVENTION

An object of the present invention is to provide an easy-to-use cleaning disk that can be inserted into a floppy disk drive and remove any contaminants from the read/write head without harmful abrasion to the head.

Another object of the invention is to provide a cleaning disk that does not produce debris, such as fibers, that further foul the read/write head.

A further object of the invention is to provide a coating that is mildly abrasive and highly magnetic.

In accordance with the present invention, there is provided a disk for cleaning a magnetic head. This disk has a thin flexible platter and a mildly abrasive, magnetic coating on at least one side of the platter for contacting the magnetic head. This coating includes magnetite ($Fe_3O_4$) having an internal crystalline form in the shape of octahedral crystals.

An advantage of using a magnetic coating for the disk is that instructions can be recorded thereon for programming the floppy disk system to cycle the head across the surface of the disk to ensure a thorough cleaning.

These and other objects and advantages of the present invention will no doubt become obvious to those of ordinary skill in the art after having read the following detailed description of the preferred embodiment.

DETAILED DESCRIPTION OF THE PREFERRED EMBODIMENT

A disk for cleaning a magnetic head has a thin flexible platter to provide support for a coating thereon that is mildly abrasive and highly magnetic. Such platters generally have a flat, round shape with a central aperture for receiving a spindle and an index aperture for generating timing signals. The size, shape and composition of such platters or supports is conventional, as shown and described in U.S. Pat. Nos. 4,065,798 to Sugisake et al., 4,106,067 to Masuyama et al., and 4,180,840 to Allen.

A coating composition is prepared to a formulation as follows:

|  |  | Percentage by weight |
|---|---|---|
| Octahedral $Fe_3O_4$ | (Pfizer MO-7029) | 60–70% |
| Conductive Carbon Black | (Vulcan XC-72R) | 3–5% |
| Dispersing Agent | (Soya Lecithin) | 1–2% |
| Binder System | (Polyurethane) | 15–25% |
| Cross-Linker | (Polyisocyanate) | 2–10% |
| Lubricant | (Fatty Acid Ester) | 1–5% |

The coating is applied to either one or both sides of the flexible platter in a thin layer. The coating is smoothed and calendered to obtain the desired surface roughness. It has been found that magnetite ($Fe_3O_4$) having an internal crystalline form in the shape of octahedral crystals is mildly abrasive, such that when in contact with a contaminated floppy disk read/write head, the contaminant is cleaned from the head. Unlike other abrasive materials such as alumina, chromium oxide, corundum, etc., magnetite in the shape of octahedral crystals does not severely abrade the magnetic head.

Another advantage of using magnetite is that it is highly magnetic. Thus, instructions or data can be recorded on the abrasive surface. The floppy disk system can be programmed, for example, to cycle the head across the abrasive surface to enhance the effectiveness of the cleaning operation.

From the foregoing description, it will be seen that a disk coating having magnetite in the shape of octahedral crystals is mildly abrasive and highly magnetic. This disk can be used to clean a read/write head without producing debris, such as fibers, that further foul the head. The disk is easy to use. It can be inserted into a floppy disk drive and remove any contaiminents from the read/write head without harmful abrasion to the head. Instructions can be magnetically recorded on the abrasive surface, and the floppy disk system can be programmed to cycle the head across the abrasive surface to ensure a thorough cleaning of the head.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A diskette for cleaning a magnetic read/write head of a flexible disk drive, said diskette comprising a thin flexible platter, and a mildly abrasive magnetic coating on at least one side of the platter for contacting the read/write head, said coating including magnetite ($Fe_3O_4$) having an internal crystalline form in the shape of octahedral crystals, conductive carbon black, a dispersing agent, a binder system, a cross linker, and a lubricant, said coating including data, magnetically recorded thereon, which is adapted for directing the read/write head across the diskette surface.

2. The diskette of claim 1 wherein said coating is composed of magnetite ($Fe_3O_4$) having an internal crystalline form in the shape of octahedral crystals 60–70%, conductive carbon black 3–5%, a dispersing agent such as soya lecithin 1–2%, a binder system such as polyurethane 15–25%, a cross-linker such as polyisocyanate 2–10%, and a lubricant such as fatty acid ester 1–5% by weight.

3. In a flexible magnetic diskette for cleaning a read/write head of a flexible disk drive, the diskette of the type having a mildly abrasive magnetic coating the improvement comprising:

a coating suitable for magnetically recording information thereon, and including magnetite ($Fe_3O_4$) having an internal crystalline form in the shape of octahedral crystals, conductive carbon black, a dispersing agent, a binder system, a cross linker and a lubricant; and information, magnetically recorded on the coating and adapted for directing the read/write head across the diskette.

4. A method for cleaning a magnetic read/write head of a flexible disk drive comprising:

inserting in a disk drive a flexible magnetic disk comprising a flexible platter, the platter having a magnetic recording surface coating, said coating comprising magnetite ($Fe_3O_4$) having an internal crystalline form in the shape of octahedral crystals, conductive carbon black, a dispersing agent, a binder system, a cross-linker and a lubricant said coating having data magnetically recorded thereon adapted for directing a read/write head to move radially across the surface of the disk; and allowing the disk to remain in the disk drive for a preselected period of time while the head is directed across the disk to ensure a thorough cleaning of the head.

* * * * *